United States Patent
Wang et al.

(10) Patent No.: US 8,687,724 B2
(45) Date of Patent: Apr. 1, 2014

(54) METHOD FOR ACCELERATING THE PRECODING AND PRE-DECODING OF SYMBOLS IN OFDM SYSTEMS

(75) Inventors: Dong Wang, Ossining, NY (US); Yue Shang, Natick, MA (US)

(73) Assignee: Koninklijke Philips N.V., Eindhoven (NL)

( * ) Notice: Subject to any disclaimer, the term of this patent is extended or adjusted under 35 U.S.C. 154(b) by 529 days.

(21) Appl. No.: 12/867,942

(22) PCT Filed: Mar. 9, 2009

(86) PCT No.: PCT/IB2009/050974
§ 371 (c)(1),
(2), (4) Date: Aug. 17, 2010

(87) PCT Pub. No.: WO2009/113011
PCT Pub. Date: Sep. 17, 2009

(65) Prior Publication Data
US 2010/0329376 A1    Dec. 30, 2010

Related U.S. Application Data

(60) Provisional application No. 61/035,394, filed on Mar. 11, 2008, provisional application No. 61/157,232, filed on Mar. 4, 2009.

(51) Int. Cl.
*H04L 23/02* (2006.01)

(52) U.S. Cl.
USPC ............ 375/261; 375/340; 375/345; 375/346

(58) Field of Classification Search
USPC .......................... 375/261, 296, 340, 345, 346
See application file for complete search history.

(56) References Cited

U.S. PATENT DOCUMENTS

| | | | | |
|---|---|---|---|---|
| 6,487,405 | B1 * | 11/2002 | Dapper | 455/424 |
| 6,822,953 | B1 * | 11/2004 | Schaefer et al. | 370/344 |
| 7,069,398 | B2 * | 6/2006 | Lin et al. | 711/157 |
| 7,539,463 | B2 * | 5/2009 | Himayat et al. | 455/101 |
| 7,593,489 | B2 * | 9/2009 | Koshy et al. | 375/340 |
| 2006/0092902 | A1 * | 5/2006 | Schmidt | 370/342 |
| 2007/0086539 | A1 * | 4/2007 | Hocevar | 375/267 |

FOREIGN PATENT DOCUMENTS

| | | |
|---|---|---|
| WO | WO2004073219 A1 | 8/2004 |
| WO | WO2007000622 A1 | 1/2007 |

OTHER PUBLICATIONS

Z. Wang et al., "OFDM or single-carrier block transmissions?," Published in IEEE Transactions on Communications, vol. 52, No. 3, pp. 380-394 Mar. 2004.

Z. Wang et al., "Linearly Precoded or Coded OFDM against Wireless Channel Fades," Published in Third IEEE Signal Processing Workshop on Signal Processing Advances in Wireless Communications, Taoyuan, Taiwan, Mar. 20-23, 2001.

\* cited by examiner

*Primary Examiner* — Qutbuddin Ghulamali
(74) *Attorney, Agent, or Firm* — Larry Liberchuk

(57) ABSTRACT

A method for performing a fast multiple-subcarrier-joint-modulation (MSJM) precoding. The method comprises grouping input information bits into bit blocks; converting the bit blocks into bit vectors; mapping a first group of bits of each bit vector to a real dimension of symbols in a symbol vector; mapping a second group of bits of each bit vector to an imaginary dimension of symbols in the symbol vector, wherein the mapping of the real dimension and the mapping of imaginary dimension are performed simultaneously; and modulating symbol vectors into data subcarriers.

13 Claims, 4 Drawing Sheets

| $[b_{q,i}(0), b_{q,i}(1), ..., b_{q,i}(5)]$ | $Re(c_1)$ | $Re(c_2)$ | $Re(c_3)$ |
|---|---|---|---|
| 000, 000 | 0 | 0 | 0 |
| 000, 001 | 0 | 1 | 1 |
| ... | ... | ... | ... |
| 000, 111 | 0 | 7 | 7 |
| 001, 000 | 1 | 0 | 1 |
| 001, 001 | 1 | 1 | 2 |
| ... | ... | ... | ... |
| 001, 111 | 1 | 7 | 0 |
| 010, 000 | 2 | 0 | 2 |
| 010, 001 | 2 | 1 | 3 |
| ... | ... | ... | ... |
| 010, 111 | 2 | 7 | 1 |
| ... | ... | ... | ... |
| 111, 000 | 7 | 0 | 7 |
| ... | ... | ... | ... |
| 111, 110 | 7 | 6 | 5 |
| 111, 111 | 7 | 7 | 6 |

FIG. 2

METHOD FOR ACCELERATING THE PRECODING AND PRE-DECODING OF SYMBOLS IN OFDM SYSTEMS

This application claims the benefits from U.S. Provisional Application No. 61/035,394 filed on Mar. 11, 2008 and U.S. Provisional Application No. 61/157,232 filed on Mar. 4, 2009.

The invention relates generally to orthogonal frequency division multiplexing (OFDM) communication systems and, more particularly, to precoding techniques performed by such systems.

The WiMedia standard defines the specifications of a media access control (MAC) layer and a physical (PHY) layer based on OFDM transmissions. The WiMedia standard enables short-range multimedia file transfers at rates up to 480 Mbps with low power consumption. The standard operates in a frequency band between 3.1 GHz and 10.6 GHz of the ultra-wideband (UWB) spectrum. The highest data rate of the WiMedia standard rate cannot meet future wireless multimedia applications, such as HDTV wireless connectivity. An effort is being made to increase the data rates to 1 Gpbs and above.

To this end, weak channel (or non-channel) coding and higher order symbol constellation techniques have been envisioned to be used in future high data rate wireless systems. For example, the WiMedia PHY data rate can be increased to 960 Mbps if a ¾ convolutional code together with a 16 quadrature amplitude modulation (QAM) are used. However, this would degrade the channel performance due to characteristics of the OFDM transmission. Specifically, with a weak channel code, the OFDM cannot exploit the frequency diversity effectively. Therefore, the channel performance is almost determined by the worst subcarrier, which has the lowest signal-to-noise-ratio (SNR). This limits the number of high data rate applications that can be carried by a conventional OFDM wireless system.

A few precoding techniques have been proposed to overcome this problem. Generally, all precoding techniques are based on jointly modulating transmit symbols onto multiple subcarriers. This allows a receiver to recover transmit symbols even if some of these subcarriers are in deep fading. Examples if precoding techniques can be found in "OFDM or single-carrier block transmissions?," by Z. Wang, X. Ma and G. B. Giannakis published in IEEE Transactions on Communications, vol. 52, pp. 380-394 March 2004, and in "Linearly Precoded or Coded OFDM against Wireless Channel Fades," by Z. Wang, and G. B. Giannakis published in Third IEEE Signal Processing Workshop on Signal Processing Advances in Wireless Communications, Taoyuan, Taiwan, Mar. 20-23, 2001.

The precoding is typically performed by a precoder circuit coupled to an input of an IFFT OFDM modulator of a transmitter and by a pre-decoder circuit coupled to the output of a FFT OFDM demodulator of a receiver. A well-designed power full precoder can effectively exploit the frequency diversity provided by multi-path channels. However, implementing a power full precoder increases the complexity of the transmitter and receiver, as it requires more sophisticated decoding and symbol mapping techniques. For example, the use of a dual carrier modulation (DCM) technique as a precoder requires replacing the QPSK symbol constellation with 16 QAM symbol constellation.

Furthermore, to guarantee full frequency diversity (i.e., diversity order of two) in high data rate modes, a higher constellation (e.g., 256 QAM) is required. For example, if a DCM technique is used to jointly modulate two information symbols, s(i) and s(i+50), formed using QAM16 constellation, a frequency diversity order of two is achieved as follows:

$$R = \frac{1}{\sqrt{17}} \begin{bmatrix} 4 & 1 \\ 1 & -4 \end{bmatrix}$$

$$\begin{bmatrix} x(i) \\ x(i+50) \end{bmatrix} = R * \begin{bmatrix} s(i) \\ s(i+50) \end{bmatrix} = \frac{1}{\sqrt{17}} \begin{bmatrix} 4 & 1 \\ 1 & -4 \end{bmatrix} * \begin{bmatrix} s(i) \\ s(i+50) \end{bmatrix}.$$

The information symbols s(i) and s(i+50) are formed using 16 QAM constellation. However, the precoding operation expands the symbol constellation to 256 QAM, i.e., the constellation of the precoded symbols x(i) and x(i+50) is 256 QAM.

Implementing and designing receivers and transmitters with such high constellation without affecting the diversity gain and the overall performance of the channel is not feasible due to the high-order precoded symbol constellation and the complexity of precoder and pre-decoder circuits. Furthermore, the time that would require for such circuits to process signals effectively eliminate these conventional precoding techniques from being practiced in high data rate wireless system.

It would be therefore advantageous to provide an efficient precoding and pre-decoding solution that overcomes the disadvantages of prior art techniques.

Certain embodiments of the invention include a method for performing a fast multiple-subcarrier-joint-modulation (MSJM) precoding. The method comprises grouping input information bits into bit blocks; converting the bit blocks into bit vectors; mapping a first group of bits of each bit vector to a real dimension of symbols in a symbol vector; mapping a second group of bits of each bit vector to an imaginary dimension of symbols in the symbol vector, wherein the mapping of the real dimension and the mapping of imaginary dimension are performed simultaneously; and modulating symbol vectors into data subcarriers.

Certain embodiments of the invention also include a computer-readable medium having stored thereon computer executable code for performing a fast multiple-subcarrier-joint-modulation (MSJM) precoding. The computer executable code causes a computer to execute the process of grouping input information bits into bit blocks; converting the bit blocks into bit vectors; mapping a first group of bits of each bit vector to a real dimension of symbols in a symbol vector; mapping a second group of bits of each bit vector to an imaginary dimension of symbols in the symbol vector, wherein the mapping of the real dimension and the mapping of imaginary dimension are performed simultaneously; and modulating symbol vectors into data subcarriers.

Certain embodiments of the invention also include an orthogonal frequency division multiplexing (OFDM) transmitter for performing a multiple-subcarrier-joint-modulation (MSJM) precoding. The OFDM transmitter comprises a first serial-to-parallel (S/P) convertor for converting bit blocks into bit vectors; a precoder for mapping a first group of bits of each bit vector to a real dimension of symbols in a symbol vector and mapping a second group of bits of each bit vector to an imaginary dimension of symbols in the symbol vector, wherein the mapping of the real dimension and the mapping of imaginary dimension are performed simultaneously; and a second S/P convertor for grouping symbol vectors and mapping the symbol vectors into data subcarriers.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIG. 2 is an exemplary lookup table showing the precoding of symbol vectors;

Figure 1:
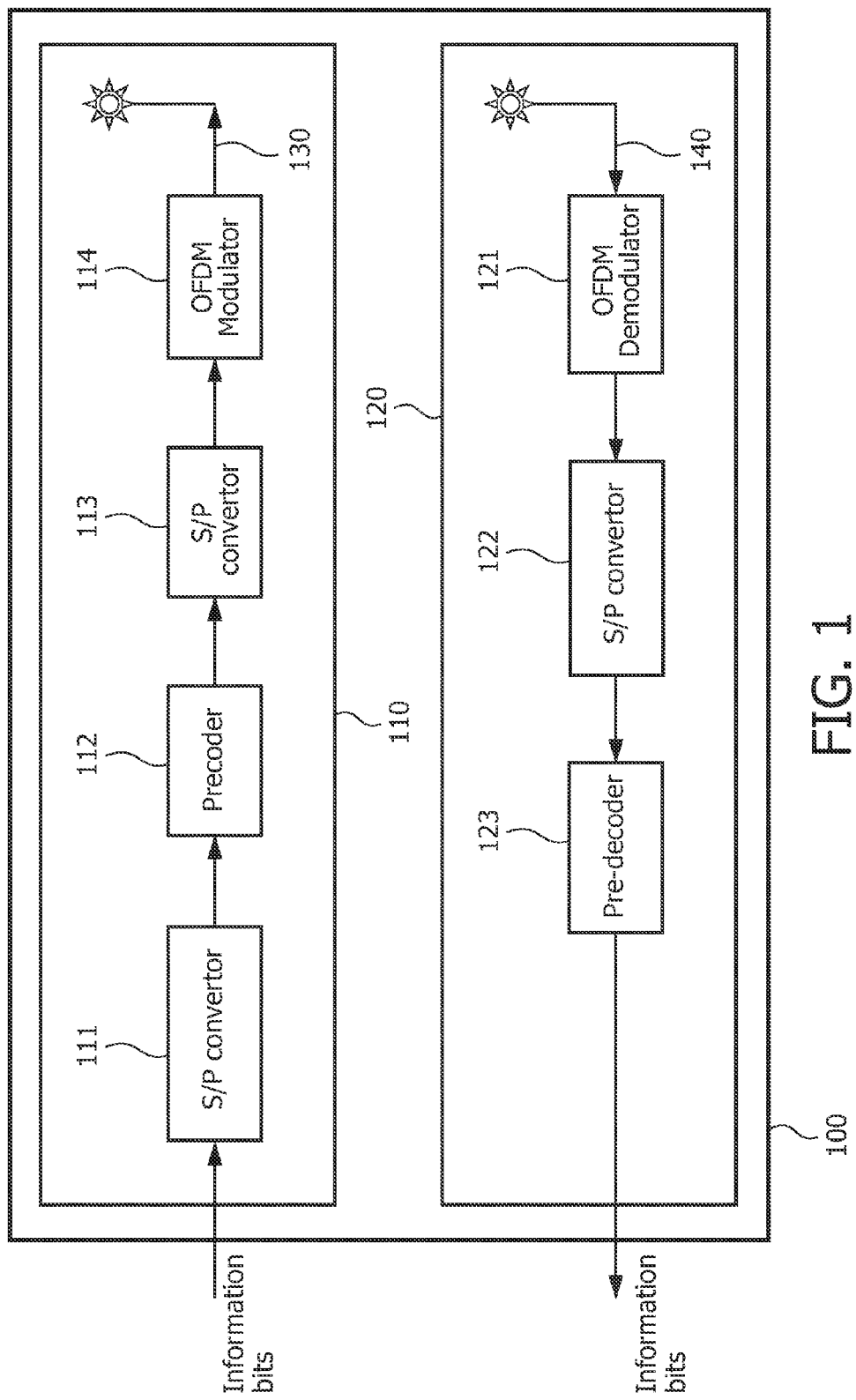
FIG. 1 is a block diagram of a conventional OFDM communication system used to describe the principles of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a non-limiting and exemplary block diagram of an OFDM based wireless system 100 used to describe the principles of the invention. The system 100 jointly precodes a number of m (m>2) subcarriers to achieve a frequency diversity order of at least two. The system 100 may be any type of OFDM based wireless system operating according to wireless communication standards including, but not limited to, WiMedia UWB versions 1.0, 1.5 and 2.0, IEEE 802.11n, WiMax, and so on.

The system 100 comprises a transmitter 110 and a receiver 120 that communicate over a wireless medium. The transmitter 110 includes serial-to-parallel (S/P) convertors 111 and 113, a precoder 112, and an OFDM modulator 114. The receiver 120 includes an OFDM demodulator 121, a serial-to-parallel (S/P) convertor 122, and a pre-decoder 123. The system 100 also comprises a transmit antenna 130 and a receive antenna 140.

In accordance with the invention, input information bits, preferably after being encoded and interleaved, are partitioned into bit blocks. Each bit block includes n*g bits, where 'n' is number of available data subcarriers and 'g' is the number of bits to be transmitted per subcarrier. The S/P convertor 111 converts each bit block to k bit vectors. For example, the i-th bit vector of the q-th bit block can be represented as follows:

$$\vec{b}_{q,i} = [b_{q,i}(0), b_{q,i}(1), \ldots, b_{q,i}(m*g-1)]$$

The number 'k' equals to the number of data subcarriers divided by the number of jointly precoded subcarriers, i.e., n/m. Each bit vector includes m*g bits.

The precoder 112 maps each bit vector to a symbol vector. A symbol vector includes m symbols. The symbol vector corresponding to the i-th bit vector of the q-th bit block may be represented as follows:

$$\vec{s}_{q,i} = [s_{q,i}(i_1), s_{q,i}(i_2), \ldots, s_{q,i}(i_m)].$$

In accordance with certain embodiments of the invention, the precoder 112 independently maps bits of a bit vector to the real dimension and the imaginary dimension of each symbol in the symbol vectors. Specifically, a symbol vector $\vec{s}_{q,i}$ is generated with two independent mapping operations: 1) mapping $y_1$ bits of the m*g bits of a bit vector $\vec{b}_{q,i}$ to real dimension values of symbols in the $\vec{s}_{q,i}$ vector; and 2) mapping the rest of m*g−$y_1$ bits of the $\vec{b}_{q,i}$ vector to the imaginary dimension values of symbols in the $\vec{s}_{q,i}$ vector. These mapping operations significantly reduce the complexity and time required for precoding of symbols.

In one embodiment of the invention, the mapping from a bit vector $\vec{b}_{q,i}$ to a symbol vector can be performed using two mapping functions defined as follows:

1. A mapping function $K_I$:

$$\left[b_{q,1}(0), b_{q,i}(1), \ldots, b_{q,i}\left(\frac{m*g}{2}-1\right)\right] \to [\text{Re}\{s_{q,1}(i_2)\}, \ldots, \text{Re}\{s_{q,i}(i_m)\}]$$

2. A mapping function $K_Q$:

$$\left[b_{q,i}\left(\frac{m*g}{2}\right), b_{q,i}\left(\frac{m*g}{2}+1\right), \ldots, b_{q,i}(m*g)\right] \to$$
$$[\text{Im}\{s_{q,i}(i_1)\}, \text{Im}\{s_{q,i}(i_2)\}, \ldots, \text{Im}\{s_{q,i}(i_m)\}]$$

where Re{x} and Im{x} denote the real dimension and the imaginary dimension of a complex number x, respectively. Each of the mapping functions $K_I$ and $K_Q$ has to achieve diversity order of two, i.e., for any two different input bit vectors, the corresponding outputs of $K_I$ (or $K_Q$) having at least two symbols in difference.

In a preferred embodiment of the invention, the precoder 112 uses lookup tables to map bit vectors to symbol vectors. When using lookup tables, the values of the bit vectors are the indexes for retrieving the values of the symbols. Various embodiments to construct the lookup tables are described in greater detail below.

The symbol vectors are grouped together and mapped into 'n' data subcarriers by the S/P convertor 113. The symbol $s_{q,i}(i_e)$, e=1, . . . m is then transmitted on the $i_e$-th data subcarrier of the q-th OFDM symbol. The ODFM modulator 114 performs an IFFT operation to generate a time-domain transmit signal, which is then transmitted through the transmit antenna 130.

A signal received at the receiver 120 is converted to a frequency domain signal through a FFT operation performed by the OFDM demodulator 121. Then, a number of m-symbol vectors: $\vec{r}_{q,i} = [r_{q,i}(i_1), r_{q,i}(i_2), \ldots, r_{q,i}(i_m)]^T$ is output by the S/P convertor 122, where $r_{q,i}(i_e)$ is the received signal of the $i_e$-th data subcarrier of the q-th OFDM symbol, and 'T' denotes the matrix transpose operation. The pre-decoder 123 generates information bits using the following equation:

$$\vec{r}_{q,i} = H_i * \vec{s}_{q,i} + \vec{N}_{q,i}$$

where $H_i = \text{diag}\{h(i_e)\}$ is a m by m diagonal matrix with the e-th diagonal element being equal to $h(i_e)$, e=1, . . . m, where $h(i_e)$, e=1, . . . , m denotes the channel parameter of the $i_e$-th data subcarrier, $\vec{r}_{q,i}$ is the received symbol vector, $\vec{s}_{q,i_i} = [s_{q,i}(i_1), s_{q,i}(i_2), \ldots s_{q,i}(i_m)]^T$ is the transmitted symbol vector, and $\vec{N}_{q,i}$ is an additive white Gaussian noise (AWGN) vector.

In accordance with the invention, the pre-decoder 123 pre-decodes the real dimension and the imaginary dimension of the symbols independently. With this aim, the pre-decoder 123 performs two de-mapping functions that may be presented as follows:

$$Re\{H_i^* r_{q,i}\} = \text{diag}\{|h(i_e)|^2\} * Re\{\vec{s}_{q,i_j}\} + Re\{H_i^* \vec{N}_{q,i}\} \qquad 1.$$

$$Im\{H_i^* r_{q,i}\} = \text{diag}\{|h(i_e)|^2\} * Im\{\vec{s}_{q,i_j}\} + Im\{H_i^* \vec{N}_{q,i}\}, \qquad 2.$$

where $H_i^* = \text{diag}\{h^*(i_e)\}$ is the complex conjugate of $H_i$, and $\text{diag}\{|h(i_e)|^2\}$ is a m by m diagonal matrix with the e-th diagonal element equals to $|h(i_e)|^2$, e=1, . . . m. The de-mapping function is executed in parallel, where each mapping function jointly pre-decodes only m*g/2 bits of the symbol. Therefore, the complexity of the pre-decoding operation is an order of $2^{(mg/2)}$, i.e., $O(2^{(mg/2)})$.

In accordance with a preferred embodiment of the invention, the pre-decoding can be simplified. In this embodiment, the receiver 120 selects at least m−1 subcarriers (from m subcarriers) having the highest signal-to-noise ratio. The symbol indexes of the respective selected subcarriers are pre-decoded separately. Since the precoding technique has a diversity order of two, the pre-decoded m−1 indexes is sufficient to recover the bit vector. This significantly reduces the complexity of the pre-decoding operation. It should be noted that the simplified pre-decoding independently recovers the real dimension values and imaginary dimension values of a symbol.

It should be noted that the independent precoding (and pre-decoding) of the real and imaginary dimensions can be performed due to the structure of digital modulation techniques, such as QAM. Specifically, a symbol of a square/rectangular QAM constellation can be described as two symbols (a real dimension and an imaginary dimension) from two pulse amplitude modulation (PAM) constellations. For example, if a symbol c is from 64 QAM, the real dimension Re(c) and the imaginary dimension Im(c) can be described as $P_R$ constellation and $P_I$ constellation respectively. Each of the $P_R$ and $P_I$ constellations is an 8 PAM constellation.

Following are non-limiting examples describing the precoding technique disclosed by the invention. In the following examples, the number of jointly precoded subcarriers 'm' is three (3), the number of available data subcarriers 'n' is 102 data, and the number of bits 'g' to be transmitted per subcarrier is four (4). The input information bits are grouped to bit blocks, each block includes 102*4=408 bits. Then, 34 (102/3=34) bit vectors are generated, each vector includes 12 (4*3=12) bits. The bit vectors are:

$$\vec{b}_{q,i} = [b_{q,i}(0), b_{q,i}(1), \ldots, b_{q,i}(11)], i=0,1,\ldots,33.$$

As the input bit vector $\vec{b}_{q,i}$ has 12 bits, the number of codewords required for the precoding is $2^{12}=64^2$. Therefore, the minimum constellation size for symbols $s_m(k)$ to achieve diversity order of two is 64. In this example, 64 QAM modulation is selected. The precoder 112 maps each bit vector $\vec{b}_{q,i}$ to a symbol vector $\vec{s}_{q,i} = [s_q(i), s_q(i+34), s_q(i+68)]$, in which all three symbols are from a 64-QAM constellation and $s_q(i)$, $s_q(i+34)$, and $s_q(i+68)$ are transmitted on the i-th, (i+34)-th and (i+68)-th data subcarriers of the q-th OFDM symbol, respectively.

The precoding can be performed using two lookup tables, one table for real dimension values and the other for the imaginary dimension values. These two look-up tables can be the same. In this example, each table includes $2^6$ rows and 3 columns. FIG. 2 is an example of a lookup table 210, where its three columns correspond to Re(c1), Re(c2), and Re(c3) being the real values of the symbols in sq(i), sq(i+34), and sq(i+68) respectively. Specifically, the symbol indexes of Re(c1) are the decimal values of bits $[b_{q,i}(0), b_{q,i}(1), b_{q,i}(2)]$ and computed using the equation:

$$Re(c_1) = \sum_{j=0}^{2} b_{q,i}(2-j)2^j$$

The symbol indexes of Re(c2) are the decimal values of bits $[b_{q,i}(3), b_{q,i}(4), b_{q,i}(5)]$ and computed using the equation:

$$Re(c_2) = \sum_{j=0}^{2} b_{q,i}(5-j)2^j$$

In accordance with one embodiment, the mapping values for Re(c3) may be determined using any Latin 2-hypercube of order 8 (or a 8 by 8 Latin square matrix). A Latin b-hypercube of order a is a b-dimensional array in which each row is a permutation of symbols 0, 1, . . . , a−1. A Latin matrix is an 'I by I' square matrix with cells containing 'I' different symbols (from 0 to (I−1)) where no symbol occurs more than once in any row or column. Specifically, the d-th element of $c_3$ column, where d−1=x*8+y, 0≤x, y<8, is the (x+1, y+1)-th element of a 8 by 8 Latin square matrix. As an example, the following Latin matrix can be used for mapping the values of Re(c3):

$$M = \begin{bmatrix} 0 & 1 & 2 & \ldots & 7 \\ 1 & 2 & 3 & \ldots & 0 \\ 2 & 3 & 4 & \ldots & 1 \\ \ldots & \ldots & \ldots & \ldots & \ldots \\ 7 & 0 & 1 & \ldots & 6 \end{bmatrix}$$

This matrix allows to express the values of Re(c3) using an eigth-ary parity check code, i.e., Re(c3)=mod(c2+c1, 8). The Re(c3) values shown in table 210 are computed using this modulo-8 operation. The precoding allows achieving diversity order of 2 as any two different rows of the lookup table include at least two symbols in difference.

It should be noted that any type (special or non-special) Latin matrices can be used to determine the values of the symbols. It should be further noted that different Latin matrices and different symbol constellation labelling (i.e., mapping between the symbol indices and the points on the symbol constellation) may result with different precoding techniques, which may have different performance. This allows selecting constellation labelling and a Latin square matrix to optimize the performance of the system.

In another embodiment, the Re(c3) values may be determined according to a binary operation defined as follows:

$$[p_{q,i}(0), p_{q,i}(1), p_{q,i}(2)] = [b_{q,i}(0), b_{q,i}(1), \ldots, b_{q,i}(5)] * G,$$

Where G equals to:

$$G = \begin{pmatrix} 1 & 1 & 0 \\ 0 & 0 & 1 \\ 0 & 1 & 1 \\ 1 & 1 & 1 \\ 1 & 0 & 0 \\ 1 & 0 & 1 \end{pmatrix}$$

and the values of Re($c_3$) column can be computed as follows:

$$\text{Re}(c_3) = \sum_{j=0}^{2} p_{q,i}(2-j)2^j.$$

The resulting Latin matrix is:

$$M1 = \begin{pmatrix} 1 & 6 & 5 & 2 & 8 & 3 & 4 & 7 \\ 4 & 7 & 8 & 3 & 5 & 2 & 1 & 6 \\ 2 & 5 & 6 & 1 & 7 & 4 & 3 & 8 \\ 3 & 8 & 7 & 4 & 6 & 1 & 2 & 5 \\ 7 & 4 & 3 & 8 & 2 & 5 & 6 & 1 \\ 6 & 1 & 2 & 5 & 3 & 8 & 7 & 4 \\ 8 & 3 & 4 & 7 & 1 & 6 & 5 & 2 \\ 5 & 2 & 1 & 6 & 4 & 7 & 8 & 3 \end{pmatrix}$$

It should be noted that a lookup table for mapping imaginary dimension values is constructed using the same techniques described herein. It should be further noted that different techniques can be utilized to construct different "real dimension" and "imaginary dimension" lookup tables.

Figure 3:
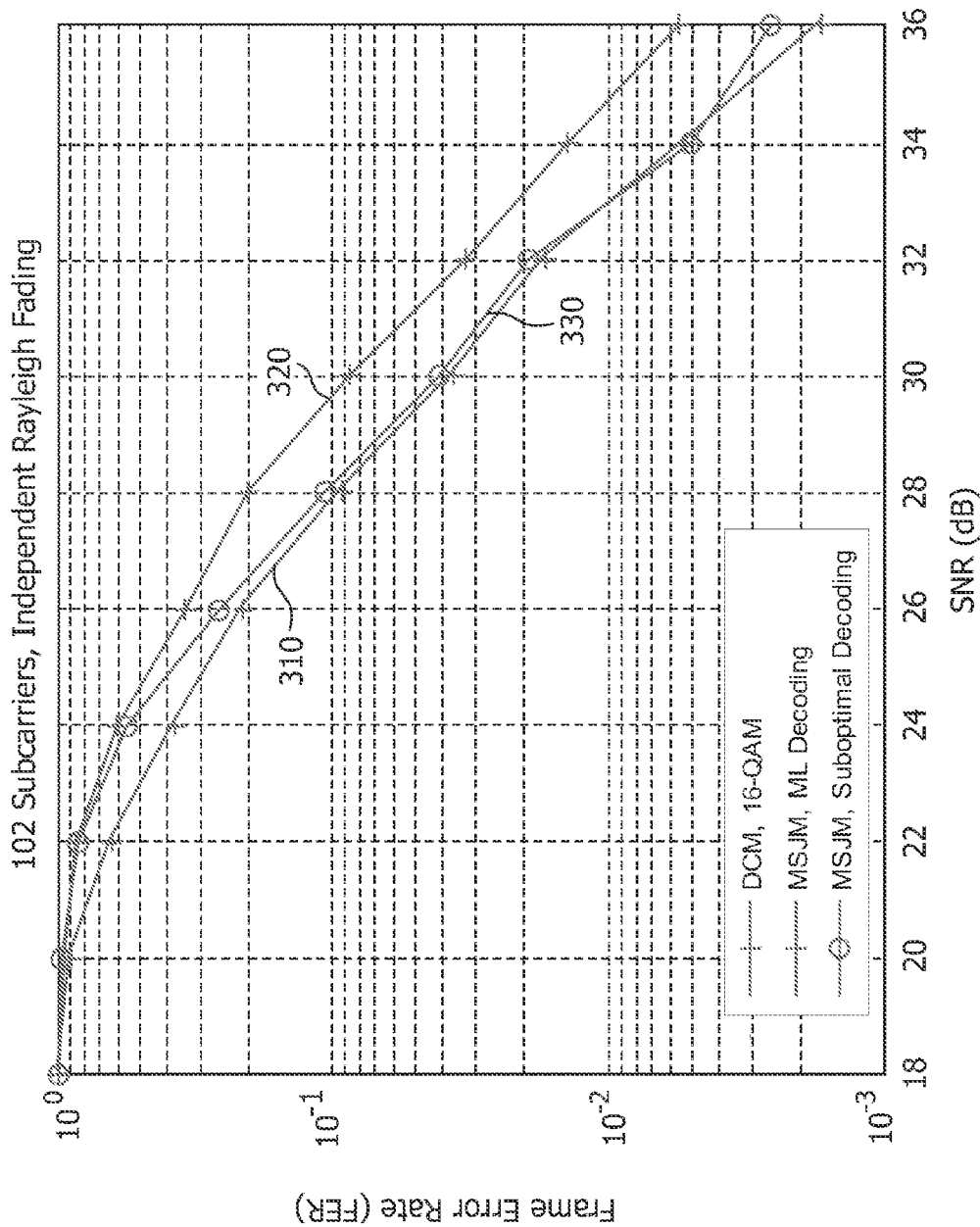
FIG. 3 is a graph showing simulation results of the fast multiple-subcarrier-joint-modulation (MSJM) precoding.

FIG. 3 shows simulation results demonstrating the performance of the precoding technique implemented in accordance with one embodiment of the invention. In the simulations, 102 data subcarriers are used. The precoding ("MSJM precoding") is done using a combination of a Gray PAM labelling and the Latin matrix M1 shown above for both the real and the imaginary dimensions, under the assumption that all data subcarriers channels are i.i.d. Rayleigh fading channels. As illustrated in FIG. 3, the gain (indicated by a curve 310) of the MSJM pre-decoding is better than the gain of the conventional DCM precoding with 16 QAM (as indicated by a curve 320). Using the simplified precoding/de-precoding technique results in a gain performance (as indicated by a curve 330) lower then the MSJM precoding/de-precoding, but the de-precoding is less complex.

Figure 4:
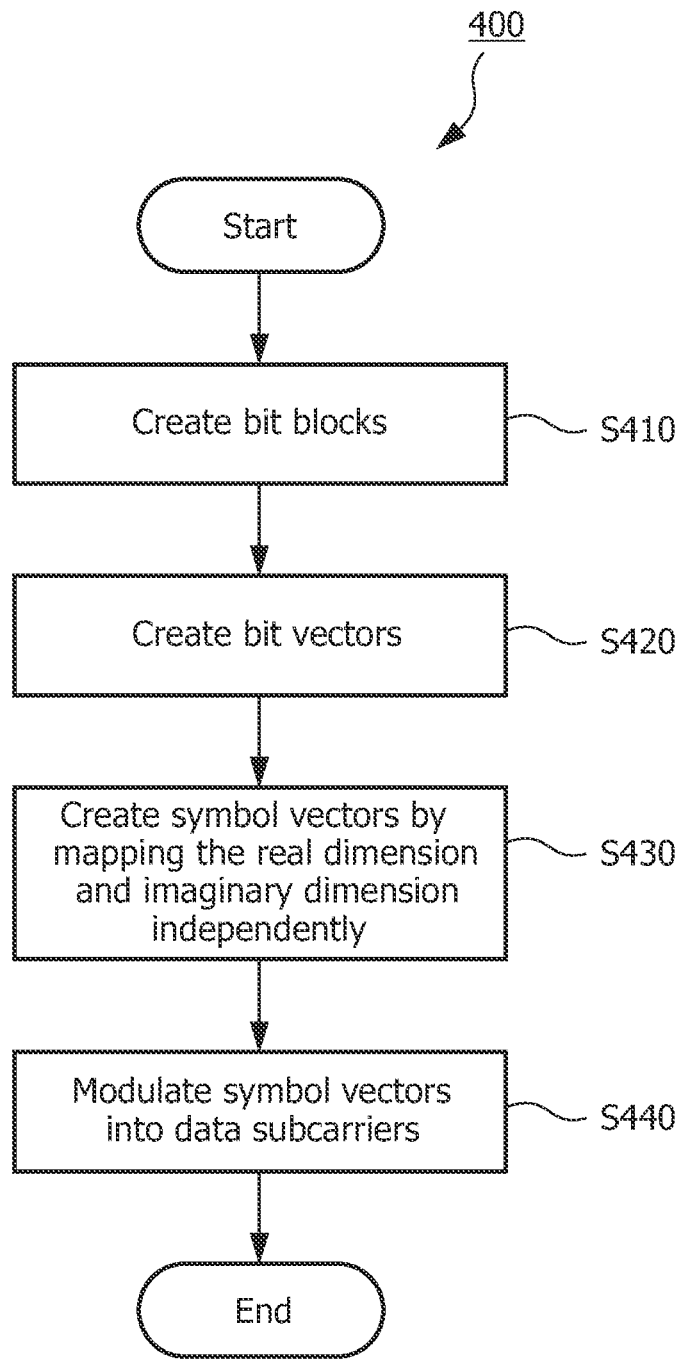
FIG. 4 is a flowchart describing the method for performing the fast MSJM precoding in accordance with an embodiment of the invention.

FIG. 4 shows a non-limiting flowchart 400 describing the method for performing a fast multiple-subcarrier-joint-modulation (MSJM) precoding implemented in accordance with an embodiment of the invention. At S410, input information bits are grouped into data blocks, each of which includes a number of n*g bits. The parameter 'n' is the number of available subcarriers, and 'g' is the number of bits to be transmitted per carrier. At S420, bit blocks are converted into bit vectors. The number of bit vectors is equal to the number of data subscribers divided by the number of jointly precoded subscribers, i.e., n/m. At S430, each bit vector is mapped into a symbol vector that includes a number of m symbols. Specifically, the method simultaneously maps $y_1$ bits of a bit vector to the real dimension of the precoded symbols and $y_2$ bits of the bit vector to real dimension of the precoded symbols. The $y_1$ bits are different than the $y_2$ bits and the number of $y_1$ plus $y_2$ bits equal to m*g. In a preferred embodiment of the invention, the mapping is performed using 2 lookup tables: one for the real dimension having $2^{y_1}$ rows and m columns, and the other for the imaginary dimension having $2^{y_2}$ rows and m columns. While operation of the method herein is discussed for generating the "imaginary dimension" lookup table, this is performed for exemplary purposes only. The discussed method is operative in generating a "real dimension" lookup table using the same steps described below.

To construct the imaginary dimension lookup table, first a table that includes $Q_I^{m-1}$ rows and m columns is generated. The parameter $Q_I$ is the minimum PAM constellation size and is determined as follows:

$$Q_I = 2^{\lceil \frac{y_2}{m-1} \rceil}$$

The values of the first 'm−1' columns are set using one of the techniques mentioned in detail above. Then a Latin (m−1)-hypercube of order $Q_I$ is inserted (row-wise) to the last (m) column. Specifically, the d-th element of the last column, where $$d - 1 = \sum_{i=1}^{m-1} x_i I^{i-1} + y, \quad 0 \le x_i < Q_I,$$

is the ($x_{m-1}+1$, $x_{m-2}+1$, . . . , $x_1+1$)-th element of a Latin (m−1)-hypercube of order $Q_I$. The last step in constructing the lookup table includes selection from the $Q_I^{m-1}$ by m table, $2^{y_2}$ different rows.

At S440, the symbol vectors are modulated onto the 'n' data subcarriers and transmitted. It would be apparent to one of ordinary skill in the art that the fast MSJM precoding enables to increase the data rates of transmission with improved gain performance and minimum symbol constellation expansion and fast precoding and pre-decoding.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What we claim is:

1. A method for performing a fast multiple-subcarrier-joint-modulation (MSJM) precoding by an orthogonal frequency division multiplexing (OFDM) transmitter, comprising:
   grouping input information bits into bit blocks;
   converting the bit blocks into bit vectors;
   mapping, using a real dimension lookup table that includes real dimension values, a first group of bits of each bit vector to a real dimension of symbols in a symbol vector;
   mapping, using an imaginary dimension lookup table that includes imaginary dimension values, a second group of bits of each bit vector to an imaginary dimension of symbols in the symbol vector, wherein the mapping of the real dimension and the mapping of the imaginary dimension are performed simultaneously; and modulating, by the OFDM transmitter, symbol vectors into data subcarriers.

2. The method of claim 1, wherein each symbol vector includes a number of m symbols, wherein m equals to the number of jointly precoded subcarriers.

3. The method of claim 2, wherein each bit vector includes a number of m*g bits, wherein g is the number of bits to be transmitted per subcarrier, and wherein the first group of bits and the second group of bits are different.

4. The method of claim 1, wherein a number of rows in the real dimension lookup table equals to a real constellation size to a power of (m−1) and a number of columns in the lookup table equals to the number of symbols in a symbol vector, and the size of the real constellation is a function of the number of bits in the first group of bits; and wherein a number of rows in the imaginary dimension lookup table equals to an imaginary constellation size to a power of (m−1) and a number of columns in the lookup table equals to the number of symbols in the symbol vector, and the size of the imaginary constellation is a function of the number of bits in the second group of bits.

5. The method of claim 4, further comprising generating the real dimension lookup table and the imaginary dimension lookup table, wherein the generation of each of the real dimension lookup table and the imaginary dimension lookup table comprises:
generating a table, wherein a number of rows and columns of the table is equal to the number of rows and columns of a lookup table;
determining mapping values for first m−1 symbols in the symbol vector by setting values in first m−1 columns in the table;
setting mapping values in the last column by inserting a Latin (m−1)-hypercube in the last column of the table; and
selecting rows having different values to construct the lookup table, wherein any two different rows in the lookup table include at least two symbols in difference, whereby the two different rows include at least two different symbols to achieve a diversity order of two.

6. The method of claim 5, wherein the values of the first m−1 columns are determined using any of: values of bits of a bit vector, binary operations, non-binary operations, and a constellation labelling.

7. A non-transitory computer readable medium having stored thereon computer executable code for performing a fast multiple-subcarrier-joint-modulation (MSJM) precoding, comprising:
grouping input information bits into bit blocks;
converting the bit blocks into bit vectors;
mapping, using a real dimension lookup table that includes real dimension values, a first group of bits of each bit vector to a real dimension of symbols in a symbol vector;
mapping, using an imaginary dimension lookup table that includes imaginary dimension values, a second group of bits of each bit vector to an imaginary dimension of symbols in the symbol vector, wherein the mapping of the real dimension and the mapping of the imaginary dimension are performed simultaneously; and
modulating symbol vectors into data subcarriers.

8. An orthogonal frequency division multiplexing (OFDM) transmitter for performing a fast multiple-subcarrier-joint-modulation (MSJM) precoding, comprising:
a first serial-to-parallel (S/P) convertor for converting bit blocks into bit vectors;
a precoder for mapping, using a real dimension lookup table that includes real dimension values, a first group of bits of each bit vector to a real dimension of symbols in a symbol vector and mapping, using an imaginary dimension lookup table that includes imaginary dimension values, a second group of bits of each bit vector to an imaginary dimension of symbols in the symbol vector, wherein the mapping of the real dimension and the mapping of the imaginary dimension are performed simultaneously; and
a second S/P convertor for grouping symbol vectors and mapping the symbol vectors into data subcarriers.

9. The OFDM transmitter of claim 8, further comprising an OFDM modulator for generating a time-domain signal to be transmitted over a wireless medium.

10. The OFDM transmitter of claim 8, wherein each symbol vector includes a number of m symbols, and wherein m equals to the number of jointly precoded subcarriers.

11. The OFDM transmitter of claim 10, wherein each bit vector includes a number of m*g bits, wherein g is the number of bits to be transmitted per subcarrier, and wherein the first group of bits and the second group of bits are different.

12. The OFDM transmitter of claim 8, wherein any two different rows in each of the lookup tables include at least two symbols in difference, whereby the two different rows include at least two different symbols to achieve a diversity order of two.

13. The OFDM transmitter of claim 12, wherein values of columns in the lookup table are determined using any of: a Latin hypercube, a Latin matrix, values of bits of a bit vector, binary operations, non-binary operations, and a constellation labelling.

* * * * *